Dec. 2, 1952 — W. R. McCLENDON — 2,620,037
CEMENTING HEAD
Filed July 2, 1951

INVENTOR
WALLACE R. McCLENDON
BY
Earl Babcock

Patented Dec. 2, 1952

2,620,037

UNITED STATES PATENT OFFICE 2,620,037

CEMENTING HEAD

Wallace R. McClendon, Duncan, Okla., assignor to Halliburton Oil Well Cementing Company, Duncan, Okla.

Application July 2, 1951, Serial No. 234,799

1 Claim. (Cl. 166—14)

This invention relates to oil and gas well equipment and more particularly to an apparatus adapted for use in conjunction with well casing cementing operations.

In one method of carrying out well cementing operations, mud is introduced into the well casing at the ground surface and forced under pressure downwardly therein and circulated out the bottom of the casing in an upward direction through the annular space between the casing and the bore hole, back to the surface. After the mud has been circulated, cement slurry is then introduced into the well casing at the ground surface and forced under pressure downwardly and out the bottom of the casing up into the annulus between the casing and the bore hole. Under ordinary cementing procedure, the cement slurry is immediately preceded by a bottom cementing plug and followed by what is commonly known as a top cementing plug, the purpose of these two plugs being to separate the mud from the cement slurry column so as to prevent contamination of the slurry. Immediately following the top plug is a column of mud which is used to pump the top plug to a pre-determined level. Such a method of cementing is disclosed in Patent No. 1,369,-891, issued to Erle P. Halliburton, March 1, 1921.

Heretofore, difficulty has been experienced in introducing both the top and the bottom traveling plugs into the casing immediately preceding and following the column of cement slurry without introducing air or mud contaminant into the cement slurry column. Further difficulty has been encountered in determining when and if said plugs have been released.

Another source of trouble in present cementing heads is the fact that they require that the flow of fluid through them be shut down momentarily in order to release the plug. This procedure is especially undesirable in releasing the top cementing plug, due to the fact that the delay allows the cement slurry column to become static, and in cases where there is a considerable amount of cement slurry in the annulus, and in cases where the cement slurry is very thick, it may be impossible to again put the cement slurry column in motion. Such cases have resulted in leaving the inside of the casing full of cement, thus resulting in the very expensive operation of drilling the cement out and re-cementing the well.

It is an object of the present invention to provide a cementing head with sufficient fluid by-pass around the top and bottom plugs to provide for easy release of both the top and bottom plugs without necessitating the shutting down of fluid flow through the cementing head, so that the cement slurry column can be kept in continuous motion during cementing operations.

It is a further object of the present invention to provide a positive means for indicating when either the top or bottom plug has been released.

It is still a further object of the present invention to provide a cementing head which is designed to contain both a top and bottom cementing plug in a pressure balance position with sufficient by-pass to allow fluid flow thereby, so as not to put any undue stress or strain on the locking and releasing mechanism for said plugs.

It is still a further object of the present invention to provide a cementing head with novel means for containing and releasing both top and bottom cementing plugs.

It is still a further object of the present invention to provide a cementing head which can be cast or forged in one piece and thus be stronger than the ordinary cementing heads in use.

Other and further objects of this invention will appear from the description below.

In the accompanying drawings, which form a part of the present specifications and are to be read in conjunction therewith, like numerals are used to represent like parts in the various views.

Figure 1:
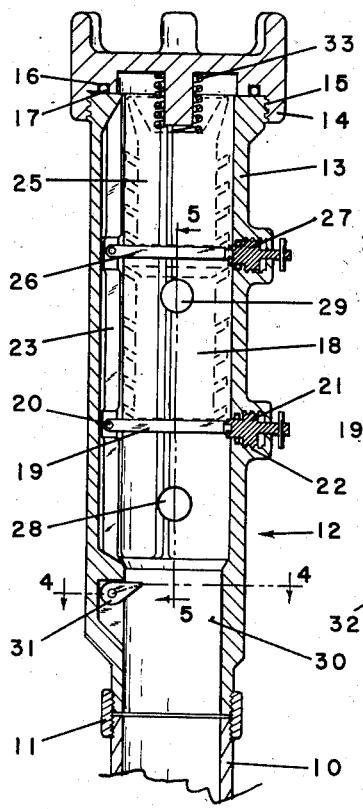
Figure 1 is a cross sectional view of a cementing head constructed in accordance with the present invention, the head being shown mounted on the top of a joint of casing.

Referring to the drawings in detail, the numeral 10 designates the upper portion of a joint of well casing in an oil or gas well installation. Secured to casing 10 by a coupling 11 is the cementing head 12, the cementing head consisting of a housing 13 and a cap 14. The cap 14 is ordinarily connected to the housing by threads 15 which under the usual conditions are a coarse thread or what is commonly known as "quick change threads" so that the cap 14 may be easily and quickly removed from the housing 13. The cap 14 is provided with a groove 16 containing a packing such as a rubber O-ring 17, so as to provide a seal to prevent the leakage of fluid from inside the cementing head. The bottom plug 18 is illustrated by dotted lines in Figure 1. This plug is held in position by a latch bar 19 pivoted about the hinge bolt 20. In order to secure the bottom plug 18 in position, the latch bar 19 is held in a horizontal position by release nut 21, which is secured in the housing by threads 22.

Figure 2:
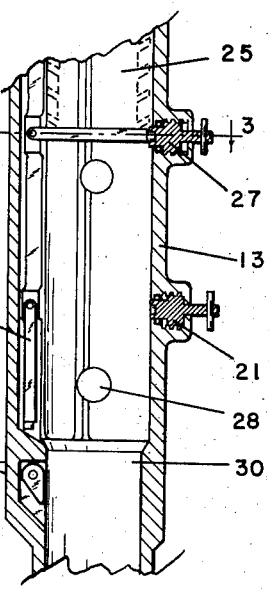
Figure 2 is a cross sectional view of the head of Figure 1, showing the mechanism for releasing the top plug, the bottom plug having been released.
Figure 3:
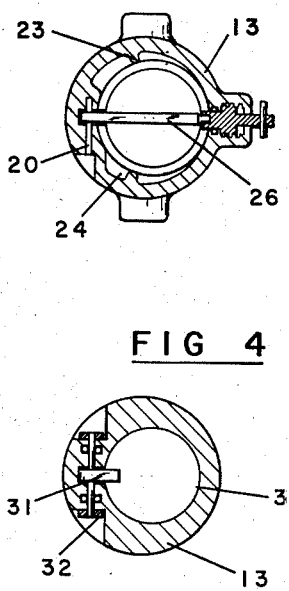
Figure 3 is a sectional view along line 3—3 of Figure 2.
Figure 4:
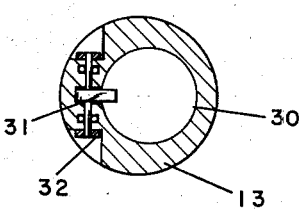
Figure 4 is a cross sectional view along line 4—4 of Figure 1.
Figure 5:
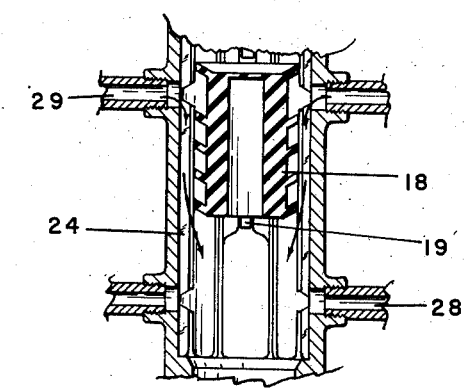
Figure 5 is a sectional view along line 5—5 of Figure 1.

The bottom plug 18 is held in an off-center position with respect to the housing 13 by ribs 23 in such a manner as to provide fluid passage through the openings 24 which are provided between the ribs, as illustrated in Figures 2 and 3. When the bar 19 is released, it swings down in between the ribs 23 to be out of the way. The upper plug 25 is held in position by a latch bar 26 and retainer nut 27, which operate in the same manner as the latch bar 19 and retainer nut 21. It will thus be seen that the top and bottom plugs are each provided with a latch so that they can be controlled individually.

An opening 28 is provided below the lower plug. This opening is normally used for an inlet for the circulation of mud prior to the time the bottom cementing plug is released. An upper opening 29 is provided through which cement slurry is pumped when it is desired to release the bottom cementing plug and start the cementing operation. The opening 29 is also used for pumping mud in behind the top cementing plug.

When it is desired to release the bottom plug, the retainer nut 21 is backed out to the position shown in Figure 2, which allows the lever arm 19 to swing back inside the ribs 23, as shown in Figure 2. The bottom plug 18 has sufficient clearance between its outside diameter and the inside diameter of the cementing head housing 13 to allow the plug to drop freely down into the reduced section 30 of the head. Upon the bottom cementing plug reaching the reduced section 30, the fluid pressure from above can be increased a sufficient amount to pump the plug down. As the bottom plug moves through the reduced section 30, the dog 31 therein will be rotated to the position shown in Figure 2. On the rotation of dog 31, the flag 32 located on the outside of the cementing head will move to the position shown in Figure 2. By the movement of this flag 32 to the extended position, the operating personnel will be aware of the fact that the bottom cementing plug has been released and pumped down into the casing 10.

The dog 31 can be reset to the position shown in Figure 1 by rotating the flag 32. By resetting the dog 31 after the bottom plug is released, it will be possible to determine when the top plug has entered casing 10. When desired the top plug 25 may be released in the same manner, the top plug being provided with sufficient clearance to allow it to drop into the flow stream of the cement slurry or mud being pumped through the inlet 29. However, as an extra precaution, a spring 33 is provided between the cap 14 and the top cementing plug, so as to move the plug in a downward direction upon the release of the lever arm 26. As the top plug 25 passes through section 30, it moves the dog 31 and flag 32 to the position shown in Figure 2, and the operator will know that the top cementing plug has entered the casing 10.

In ordinary operations, the above described device functions in the following manner: A mud supply pump is connected to the openings 28 and a cement slurry supply pump is connected to the openings 29 with the bottom plug 18 and the top plug 25 in the position shown in Figure 1. Immediately preceding the cementing operation, mud is circulated in through the opening 28 and down the casing 10. When it is desired to start the cementing operation, the mud pump is stopped and the cementing pump started. At the same time, the bottom cementing plug is released by backing off the release nut 21 so as to allow the lever arm 19 to swing to the position shown in Figure 2. By so doing, the bottom plug 18 drops freely to the reduced section 30, and it is then pumped by pumping fluid, such as mud, water or oil, down into the casing 10. As the bottom plug 18 passes the dog 31, the same is moved to the position shown in Figure 2. The passage of the plug is indicated to the operator by the movement of the flag 32.

If it is desired to pump mud in through ports 29 prior to the release of the bottom plug 18, there is sufficient clearance provided at 24 to allow by-pass of fluid around the plug 18 and thus allow it to remain in hydrostatic equilibrium in the position shown in Figure 1.

Cement slurry is pumped in through port 29 to immediately follow the bottom plug 18. After sufficient cement slurry has been pumped into the casing, the top cementing plug 25 is released by backing off the retainer nut 27 to allow the lever arm 26 to swing to a vertical position. Upon the movement of the lever arm 26, the spring 23 pushes the top cementing plug 25 in a downward direction until the plug enters the stream of fluid flowing from either port 29 or 28, whereupon fluid pressure forces the cementing plug down into the reduced section 30, which again actuates the dog 31 and the flag 32, assuming they have been reset to the position shown in Figure 1 after the bottom cementing plug 18 has moved them.

From the above description, it can be seen that the present cementing head provides quite a few advantages over those of the prior art in that the cementing operation now can be continuous with positive indications as to when each of the cementing plugs travels down into the casing.

It is to be understood that this invention is not limited to the details of the above description even though only one embodiment of the invention has been shown and described. It is obvious that various changes may be made without departing from the spirit of this invention or the scope of the annexed claim.

I claim:

A cementing head for use in cementing casing in an oil well or the like, consisting essentially of a housing adapted to be connected to the casing to receive and retain a top cementing plug and a bottom cementing plug in vertical position, one above the other, and having openings for making connection to mud and cement slurry pumps, a cap on the housing and a spring abutting against the cap and adapted to engage the top cementing plug and urge it downwardly, ribs in said housing for providing a by-pass for the flow of fluid from a point above to a point beneath the bottom plug when it is retained in the housing, latches for holding the plugs individually in position in the housing until manually released, a flag outside of said housing and a flag actuating dog inside of said housing arranged to be actuated by a passing plug and adapted to move the flag upon the passage of a plug into the casing.

WALLACE R. McCLENDON.

REFERENCES CITED

The following references are of record in the file of this patent:

UNITED STATES PATENTS

| Number | Name | Date |
|---|---|---|
| 1,369,891 | Halliburton | Mar. 1, 1921 |
| 1,662,311 | Hamer | Mar. 13, 1928 |
| 1,750,143 | Wickersham | Mar. 11, 1930 |
| 1,791,874 | Rodgers | Feb. 10, 1931 |
| 1,882,099 | Trouth | Oct. 11, 1932 |
| 1,974,986 | Ferlin | Sept. 25, 1934 |